May 13, 1958

F. J. SHARN ET AL 2,834,394

APPARATUS FOR ASSEMBLING AND BONDING TOGETHER
MASTIC WASHERS AND NUT-WASHERS

Filed Aug. 2, 1956

Fred J. Sharn,
Arthur H. Boundy,
Inventors.
Koenig and Pope,
Attorneys.

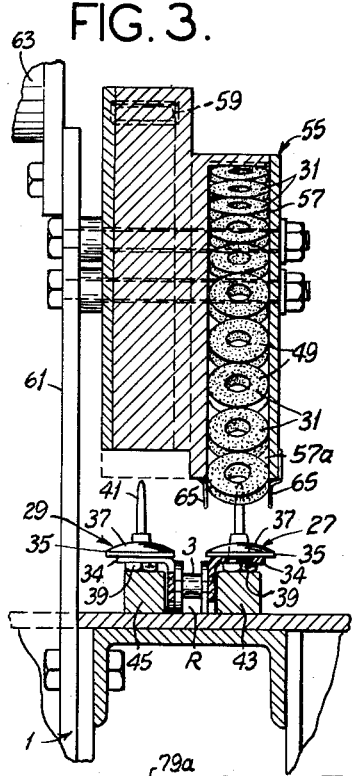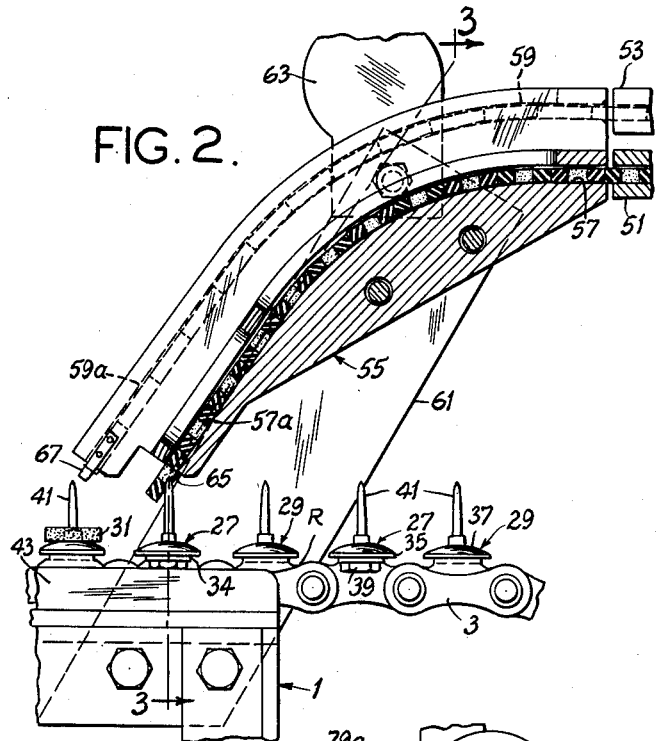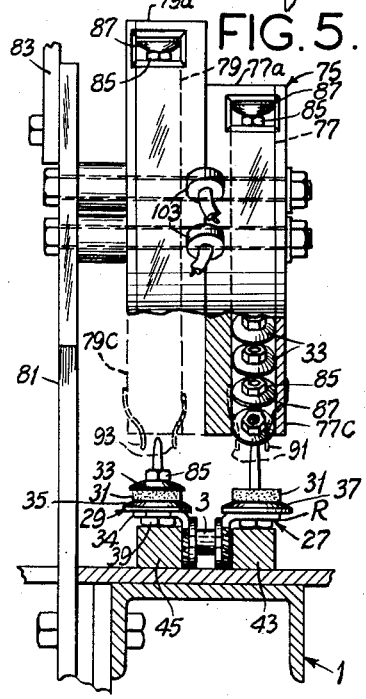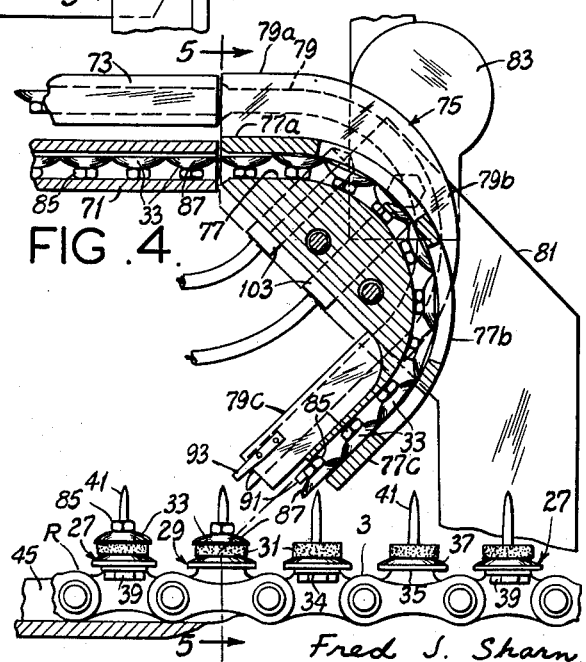

May 13, 1958 F. J. SHARN ET AL 2,834,394
APPARATUS FOR ASSEMBLING AND BONDING TOGETHER
MASTIC WASHERS AND NUT-WASHERS
Filed Aug. 2, 1956 3 Sheets-Sheet 3
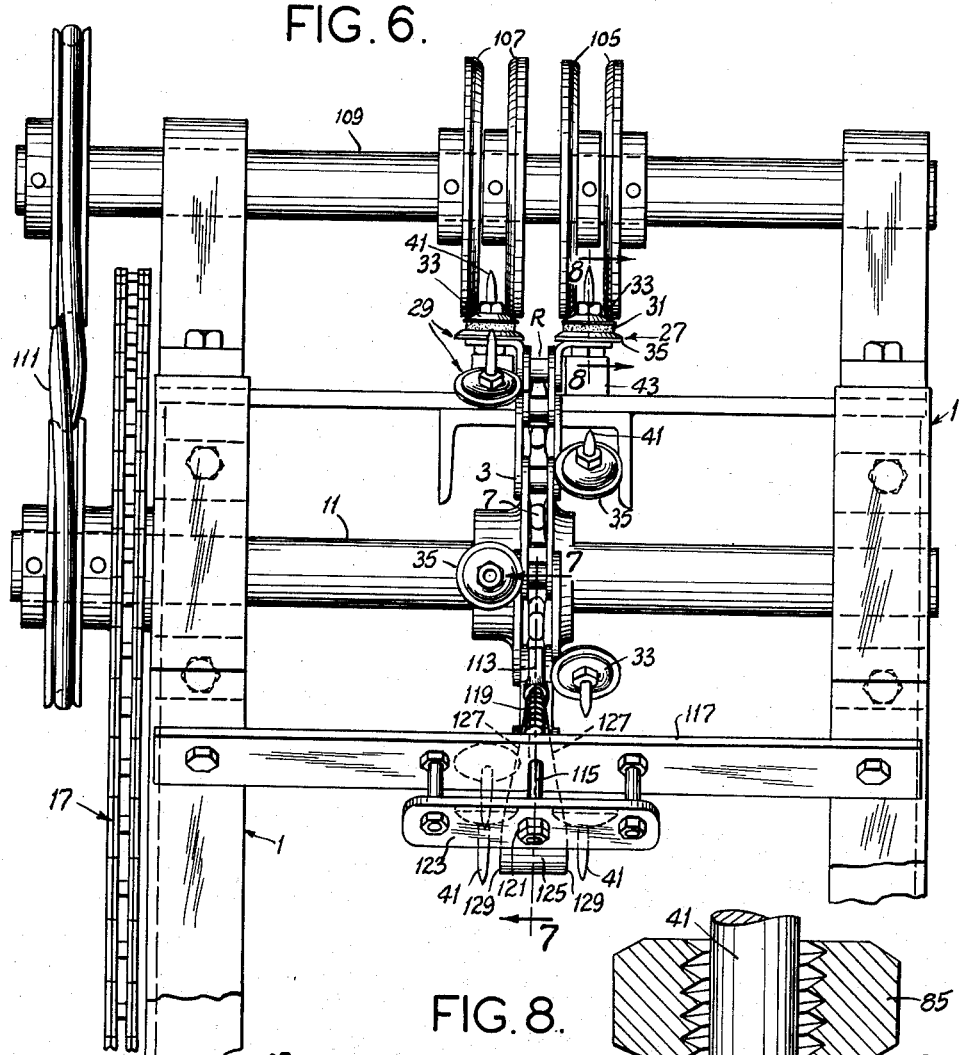
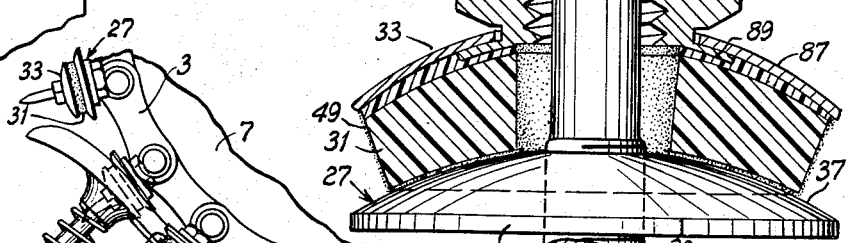
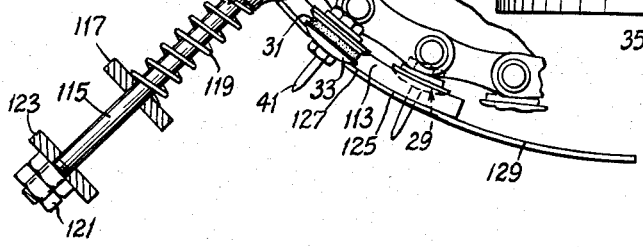
Fred J. Sharn,
Arthur H. Boundy,
Inventors.
Koenig and Pope,
Attorneys.

United States Patent Office 2,834,394
Patented May 13, 1958

---

2,834,394
APPARATUS FOR ASSEMBLING AND BONDING TOGETHER MASTIC WASHERS AND NUT-WASHERS

Fred J. Sharn, St. Louis, Mo., and Arthur H. Boundy, Grosse Pointe Farms, Mich., assignors to American-Marietta Company, Chicago, Ill., a corporation of Illinois Application August 2, 1956, Serial No. 601,685

10 Claims. (Cl. 154—1)

This invention relates to apparatus for assembling and bonding together sealing members and metal members, and more particularly to such apparatus for assembling and bonding together mastic sealing washers and metal fastener elements.

The invention is herein disclosed as it pertains to apparatus for the continuous production of nut-washer and mastic washer assemblies such as are disclosed in the copending coassigned application of Robert W. Arnold entitled Sealing Members and Methods, Serial No. 601,691, filed August 2, 1956.

The nut-washer shown in said Arnold application consists of an assembly of a nut and a cupped metal washer. A nut-washer and mastic washer assembly as disclosed in the Arnold application consists of a nut-washer and a mastic sealing washer bonded to the pressure face of the cupped metal washer part of the nut-washer by means of a bonding agent, such as a thermoplastic or thermosetting resin, which is adapted to be activated by heat to effect bonding. In particular, the mastic sealing washer has dusted on the surface thereof a powdered nontacky thermoplastic or thermosetting resin, the resin preventing undesired sticking of the mastic washer, and being adapted upon being heated to bond the mastic washer to the pressure face of the cupped metal washer.

Among the several objects of the invention may be noted the provision of apparatus for automatically assembling and bonding together the mastic washers and nut-washers above described; the provision of apparatus which acts to activate only the portion of the bonding agent between the mastic washer and the nut-washer, the remainder of the bonding agent being unactivated so that it remains effective to prevent undesired sticking of the mastic washer; and the provision of apparatus which is of economical construction, reliable in operation, and capable of a high rate of production in continuous operation with minimum attention. In general, an apparatus of this invention comprises a conveyor, a series of holders on the conveyor each adapted to receive a mastic washer and a nut-washer, means for delivering a sealing member and a heated metal member to a holder, and means for pressing together the heated nut-washer and the mastic washer on a holder. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a view in side elevation of an apparatus of this invention;

Fig. 2 is an enlargement of a fragment of Fig. 1, with parts broken away and shown in section;

Fig. 3 is a cross section taken on line 3—3 of Fig. 2;

Fig. 4 is an enlargement of another fragment of Fig. 1, with parts broken away and shown in section;

Fig. 5 is a cross section taken on line 5—5 of Fig. 4;

Fig. 6 is a left end view of Fig. 1;

Fig. 7 is a cross section taken on line 7—7 of Fig. 6; and

Fig. 8 is an enlarged cross section taken on line 8—8 of Fig. 6.

Corresponding reference characters indicate corresponding parts throughout the several views of the drawings.

Figure 1:
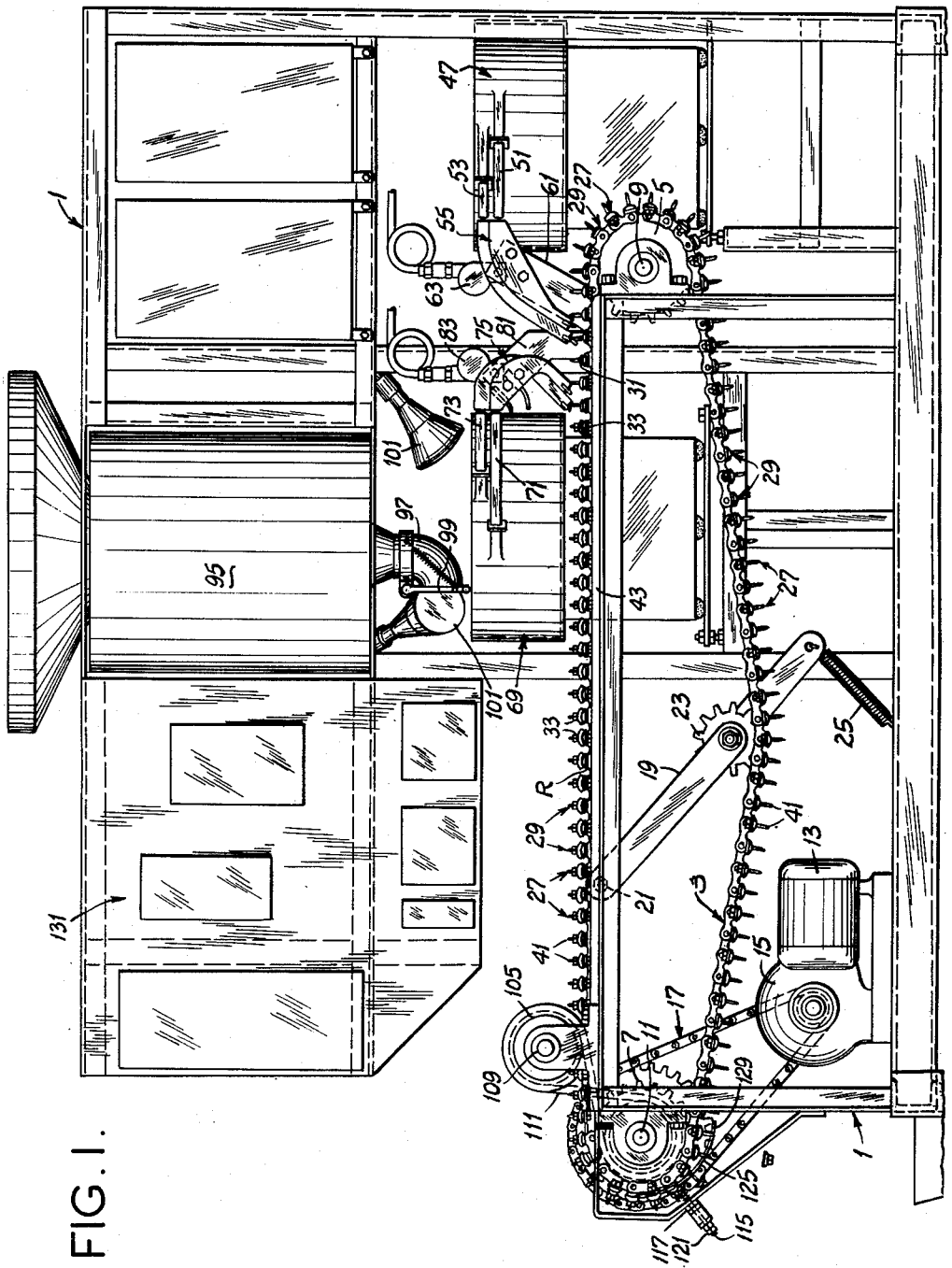

Referring to the drawings, an apparatus of this invention is shown to comprise a frame generally designated 1 supporting an endless chain 3 which constitutes a conveyor. The chain 3 is trained around sprockets 5 and 7 mounted on horizontal shafts 9 and 11 journalled in the frame. The chain has an upper horizontal reach R between the sprockets. The frame is in the form of a table. The upper horizontal reach R of the chain travels over and is supported against downward deflection by the top of the table. The chain is adapted to be continuously driven in counterclockwise direction as viewed in Fig. 1 by means comprising an electric motor 13, a speed reducer 15, and a chain and sprocket drive 17 connected to the sprocket shaft 11. Accordingly, the upper horizontal reach R of the chain travels forward over the top of the frame or table 1 from right to left as viewed in Fig. 1. An arm 19 pivoted at 21 on the frame 1 carries a chain-tensioning sprocket 23 engaging the lower reach of the chain. A spring 25 is provided for biasing the arm 19 toward the chain.

The chain 3 has a series of holders 27 at one side and a series of holders 29 at the other side (see Figs. 1, 3, 5 and 6) each adapted to receive and hold in assembly a mastic washer 31 and a nut-washer 33. The holders of each series are identical, each comprising an ear 34 projecting laterally outward from a link of the chain. On the outer surface of the ear 34 (the surface of the ear which faces upward in the upper reach R of the chain) is a circular nut 35 having a convex outer face 37. The nut is fixed on the ear 34 by means of a bolt 39 extending through an opening in the ear and threaded in the nut. The bolt has a reduced-diameter unthreaded extension 41 which projects from the convex face 37 of the nut 35 and which acts as a centering pin. Rails 43 and 45 are provided on the top of the table 1 on opposite sides of the chain 3 on which slide the heads of the bolts 39 of the respective series of holders 27 and 29. The centering pins 41 project upward in the upper reach R of the chain.

Means is provided for delivering a mastic washer 31 to a centering pin 41 at a first station on the path of the upper reach R of the chain. This means comprises a vibratory parts feeder 47 of a known commercially available type, comprising a vibratory bowl which has two spirally inclined tracks around its inside perimeter up which parts (in this instance sealing washers 31) are fed in response to vibration of the bowl. Reference may be made to U. S. Patents 2,187,717, 2,305,943, 2,462,416, 2,615,184, 2,662,192 and 2,662,193 for information as to such feeders. It will be understood that the washers 31, which are made of a tacky, mastic sealing material, are provided on the entire surface area thereof as indicated at 49 with a dusting of powdered nontacky thermoplastic or thermosetting resin. The powdered resin is applied to the mastic washers 31 before they are placed in the bowl of the feeder. The resin prevents the washers 31 from sticking together in the bowl and enables them to be fed one-by-one up the inclined tracks of the feeder to tangential discharge outlets 51 and 53.

From the outlets 51 and 53 the washers 31 pass into a guide generally designated 55 (see Figs. 1–3), having a chute 57 receiving washers from outlet 51 and a chute 59 receiving washers from outlet 53. The guide 55 is fixed to a vertical supporting plate 61 which extends upward from the frame or table 1. A compressed-air-operated vibrator 63 is attached to the plate 61 for vibrating the guide 55. The chute 57 is located in the plane of the series of holders 27, and the chute 59 is located in the plane of the series of holders 29. The chutes 57 and 59 curve downward from the respective discharge outlets 51 and 53 and have inclined lower end portions 57a and 59a, respectively, converging toward the upper reach of the chain adjacent the right end of the upper reach, and terminating slightly above the paths of the tips of the centering pins 41. The washers 31 travel edgewise through the chutes. Spring fingers such as indicated at 65 and 67 at the lower end of each of the chutes 57 and 59, respectively, are for the purpose of holding washers 31 in an inclined position projecting partly out of the lower ends of the chutes for engagement by pins 41.

Means is provided for delivering a heated nut-washer 33 to a centering pin 41 at a second station along the path of the upper reach R of the chain. This means comprises a vibratory parts feeder 69 (see Fig. 1) of the same type as feeder 47, having two spirally inclined tracks up which parts (in this instance nut-washers 33) are fed one-by-one in response to vibration of the bowl of the feeder to two tangential discharge outlets 71 and 73. From these outlets the nut-washers pass into a guide 75 (see Figs. 1, 4 and 5), having a chute 77 receiving nut-washers from outlet 71 and a chute 79 receiving nut-washers from outlet 73. The guide 75 is fixed to a vertical supporting plate 81 which extends upward from the frame or table 1. A compressed-air-operated vibrator 83 is attached to plate 81 for vibrating the guide 75. The chute 77 is located in the plane of the series of holders 27, and the chute 79 is located in the plane of the series of holders 29.

A nut-washer 33 (best illustrated in Fig. 8) comprises an assembly of a nut 85 and a cupped metal washer 87. The washer is held in assembly with the nut by a bent-out flange portion 89 of the nut. The nut is rotary relative to the washer 87. Under the influence of the vibration of the feeder 69, most of the nut-washers exit from the feeder in nut-down position (see Fig. 4). The discharge outlets 71 and 73 extend rearward in relation to the direction of travel of the upper reach of the chain. The chutes 77 and 79 have upper portions 77a and 79a extending horizontally rearward from the outlets 71 and 73, reverse-curved portions 77b and 79b extending from portions 77a and 79a, and inclined lower end portions 77c and 79c converging in forward direction toward the upper reach of the chain and terminating slightly above the paths of the tips of the centering pins 41. The nut-washers travel edgewise through the chutes and are reversed from nut-down position to nut-up position as shown in Fig. 4, so as to be delivered to the pins 41 in nut-up position. Spring fingers such as indicated at 91 and 93 are provided at the lower end of each of the chutes 77 and 79, respectively, for the purpose of holding nut-washers in an inclined position projecting partly out of the lower ends of the chutes for engagement by pins 41.

Above the bowl of the nut-washer feeder 69 is a nut-washer hopper 95, having a bottom discharge outlet 97 normally closed by a gate 99. The hopper is provided with any suitable means for preheating the nut-washers therein, such as an electrical resistance type of heater. The feeder 69 is supplied from time to time with preheated nut-washers from the hopper by opening the gate. Nut-washers in the bowl of feeder 69 are maintained heated by means of heat lamps 101. Nut-washers being fed through chutes 77 and 79 are maintained heated by means of heaters such as electrical resistance heaters 103 in the guide 75 (see Fig. 4).

The above-described arrangement is such that as a pin 41 of series 27 passes under the lower end of chute 57, it engages the mastic washer 31, held by spring fingers 65 in inclined position at the lower end of chute 57, as illustrated in Fig. 2, and pushes this washer out from between the fingers and out of the chute. The tip of the pin enters the hold in the washer and the washer falls down on the pin to a seat on the convex face 37 of nut 35. Similarly, as a pin 41 of series 29 passes under the lower end of chute 59 it receives a mastic washer 31 from chute 59. Then, as a pin 41 of series 27 with a mastic washer 31 thereon passes under the lower end of chute 77, it engages the nut-washer 33, held by spring fingers 91 in inclined position at the lower end of chute 77, as illustrated in Fig. 4, and pushes this nut-washer out from between the fingers and out of the chute. The tip of the pin enters the nut 85 of the nut-washer and the nut-washer falls down on the pin to overlie the washer 31 on the pin. Similarly, as a pin 41 of series 29 with a mastic washer 31 thereon passes under the lower end of chute 79 it receives a nut-washer from chute 79.

Means is provided for pressing together the heated nut-washers 33 and the mastic washers 31 on the pins 41 at a third station along the path of the upper reach R of the chain. This means, as shown in Figs. 1 and 6, comprises a pair of presser wheels 105 for operation on the series 27, and a pair of presser wheels 107 for operation on the series 29. These wheels are coaxially mounted in axially spaced relation for rotation on a fixed horizontal axis located above and extending transverse to the path of the upper reach of the chain, being secured on a horizontal shaft 109 journalled in the frame. The shaft 109 is driven in clockwise direction, as viewed in Fig. 1, from the sprocket shaft 11 by a belt and pulley drive 111. Wheels 105 are located on opposite sides of the path of travel of pins 41 of series 27. Wheels 107 are located on opposite sides of the path of travel of pins 41 of series 29. The wheels 105 are spaced so that the pins 41 of series 27 pass between them without engaging them. Wheels 107 are spaced so that pins 41 of series 29 pass between them without engaging them. The radius of the wheels is greater than the distance from their axis to the tips of the pins and somewhat less than the distance from their axis to the convex seats 35. As a holder of series 27 or 29, comprising a nut or seat 35 and a pin 41 carrying a mastic washer 31 and a nut-washer 33, passes between the respective pair of wheels 105 or 107, the wheels press the heated nut-washer downward against the mastic washer and press the mastic washer downward against the convex face 37 of the nut or seat 35. This effects bonding of the nut-washer and the sealing washer, and results in cupping of the mastic washer to conform to the cup shape of the washer part 87 of the nut-washer.

Means is provided for stripping the resultant nut-washer and mastic washer assemblies from the holders 27 and 29 as they travel beyond the presser wheels 105 and 107. As shown in Figs. 1, 6 and 7 this means comprises a curved shoe 113 positioned adjacent the portion of the chain 3 which travels down and under around the forward sprocket 7. This shoe is fixed on a rod 115 slidable in an opening in a crossbar 117 of the frame 1. The shoe is biased in the direction toward the chain by a spring 119 to an innermost position determined by engagement of a nut 121 on the end of the rod with a stop plate 123. In this innermost position of the shoe, it is spaced slightly from the chain. It may yield outward against the bias of the spring 119. A curved plate 125 is fixed to the outside of the shoe and extends from the shoe in the direction of travel of the chain. This plate has side edges 127 which diverge in the direction of travel of the chain leading to parallel side edges 129. The plate 125 is curved on an arc different from that of the chain so that it diverges from the chain in the direction of travel of the chain.

With the shoe 113 in its innermost position, the plate 125 is so located that as each nut-washer and mastic washer assembly on a holder 27 or 29 comes around the sprocket 7, the rim of the nut-washer engages an edge 127 of the plate, thereby causing the nut-washer and mastic washer assembly to spin on the pin 41. This spinning of the nut-washer and mastic washer assembly frees it of any tendency of the mastic washer to stick to the holder. Usually the assembly drops off the pin 41 before the assembly travels any substantial distance along the edge of the plate 125, but if the assembly should remain longer on the pin, the outer face of the cupped washer part 87 of the nut-washer rides along the edge of the plate 125 on the inside of the plate to the point where an edge 129 of the plate engages the nut 85 of the nut-washer. This pulls the nut-washer and mastic washer assembly outward on the pin, and when the assembly travels beyond the end of the plate 125 it drops off.

A control panel is indicated at 131. On this panel are mounted suitable controls for the feeders, heaters (including lamps 101) and the chain drive motor.

Operation is as follows:

The chain 3 is continuously driven in counter-clockwise direction as viewed in Fig. 1, so that its upper reach R travels from right to left as viewed in Fig. 1. The bowl of the mastic washer feeder 47 is supplied with resin-dusted sealing washers 31. The bowl of the nut-washer feeder 69 is supplied with heated nut-washers from the hopper 95. The nut-washers in the bowl of feeder 69 are maintained heated by heat lamps 101. The feeders 47 and 69 are vibrated to feed mastic washers 31 to the outlets 51 and 53 and heated nut-washers to the outlets 71 and 73. Washers 31 pass from outlets 51 and 53 to chutes 57 and 59 in guide 55. Heated nut-washers 33 pass from outlets 71 and 73 to chutes 77 and 79 in guide 75. Nut-washers passing through chutes 77 and 79 are maintained heated by heaters 103. Guides 55 and 75 are vibrated by the vibrators 63 and 83 to shake down washers 31 and nut-washers 33 in the chutes 57, 59, 77 and 79.

As a pin 41 passes under the lower end of one of the mastic washer chutes 57 and 59, it picks up the mastic washer 31 at the lower end of the chute, as previously described. Additional washers are shaken down in the chutes to take their places for engagement by the successive pins of the series. The pins 41 with mastic washers 31 thereon then pass under the lower ends of the nut-washer chutes 77 and 79 and pick up the heated nut-washers 33 at the lower ends of these chutes, as previously described. Additional nut-washers are shaken down in the chutes to take their places for engagement by the successive pins of the series.

As the pins 41 with the mastic washers 31 and heated nut-washers 33 thereon approach the left end of the upper reach of the chain, the pins pass between the pairs of presser wheels 105 and 107 (see Fig. 6) and the wheels press the heated nut-washers down on the mastic washers and press the mastic washers down against the seats 35. The powdered resin on the upper face of the mastic washer which is squeezed into contact with the cupped metal washer part 87 of the nut-washer is activated by heat from the nut-washer and, upon setting of the resin, the nut-washer and mastic washer are bonded together. The powdered resin on the surface portions of the mastic washers which do not contact the nut-washer is not activated, and keeps the mastic washer from sticking tightly to the seat 35 and pin 41. Finally, the pins 41, carrying the resultant nut-washer and mastic washer assemblies, pass around the sprocket 7 and the assemblies are stripped from the pins and fall downward therefrom as illustrated in Fig. 1.

Reference may be made to the above-mentioned Arnold application for details as to suitable resins for use at 49 on the mastic washers and as to nut-washer temperatures suitable for effecting the bonding of the nut-washers and mastic washers.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for assembling and bonding together mastic washers and nut-washers, the mastic washers having a bonding agent thereon adapted to be activated by heat, said apparatus comprising an endless chain, means for driving the chain, the chain having an upper horizontal reach, a series of holders on the chain each comprising a seat having a convex face and a pin extending outward from said face, the pins extending upward in the upper horizontal reach of the chain, means for delivering a mastic washer onto a pin at one station on the path of travel of the upper reach of the chain, the pin being received in the aperture of the mastic washer, means for delivering a heated nut-washer onto the pin at another station along the path of the upper reach of the chain, the nut-washer overlying the mastic washer and the pin being received in the nut-washer, and means at a third station along the path of the upper reach of the chain for pressing the heated nut-washer on a pin against the mastic washer on the pin and for pressing the mastic washer against the convex face of the seat to deform the mastic washer to conform to the shape of said face.

2. Apparatus as set forth in claim 1 wherein said pressing means comprises a pair of coaxial axially spaced presser wheels located on opposite sides of the path of travel of the pins.

3. Apparatus as set forth in claim 1 further comprising means for stripping the nut-washer and mastic washer assemblies from the pins including means for spinning said assemblies on the pins.

4. Apparatus for assembling and bonding together mastic washers and nut-washers, the mastic washers having a bonding agent thereon adapted to be activated by heat, said apparatus comprising an endless chain trained around a rearward and a forward sprocket and having an upper horizontal reach extending from the rearward to the forward sprocket, means for driving the chain, a series of holders on the chain each comprising a seat having a convex face and a pin extending outward from said face, the pins extending upward in the upper horizontal reach of the chain, means comprising a vibratory feeder and an inclined chute for delivering a mastic washer onto a pin at one station on the path of travel of the upper reach of the chain, the pin being received in the aperture of the mastic washer, means comprising a vibratory feeder and an inclined chute for delivering a heated nut-washer onto the pin at another station along the path of the upper reach of the chain, the nut-washer overlying the mastic washer and the pin being received in the nut-washer, means for delivering heated nut-washers to the vibratory nut-washer feeder, means for heating nut-washers in the nut-washer feeder, and means at a third station along the path of the upper reach of the chain for pressing the heated nut-washer on a pin against the mastic washer on the pin and for pressing the mastic washer against the convex face of the seat to deform the mastic washer to conform to the shape of said face.

5. Apparatus as set forth in claim 4 wherein said pressing means comprises a pair of coaxial axially spaced presser wheels located on opposite sides of the path of travel of the pins.

6. Apparatus as set forth in claim 4 wherein means is provided for vibrating each chute means.

7. Apparatus as set forth in claim 4 wherein means is provided for heating the chute means for the metal members.

8. Apparatus as set forth in claim 4 wherein means is provided for stripping the nut-washer and mastic washer assemblies from the pins as they travel down and around the forward sprocket including means for spinning said assemblies on the pins.

9. Apparatus for assembling and bonding together mastic washers and nut-washers, the mastic washers having a bonding agent thereon adapted to be activated by heat, said apparatus comprising an endless conveyor trained around rearward and forward guide elements and having an upper horizontal reach movable in a predetermined path between the rearward and the forward guide elements, means for driving the conveyor, a series of holders on the conveyor each comprising a seat having a convex face and a pin projecting from said face, the pins extending upward in the upper horizontal reach of the conveyor, means for delivering a mastic washer onto a pin at one station on the path of travel of the upper reach of the conveyor, the pin being received in the aperture of the mastic washer, means for delivering a heated nut-washer onto the pin at another station along the path of travel of the upper reach of the conveyor, the nut-washer overlying the mastic washer and the pin being received in the nut-washer, and means at a third station along the path of travel of the upper reach of the conveyor for pressing the heated nut-washer on a pin against the mastic washer on the pin and for pressing the mastic washer against the convex face of the seat to deform the mastic washer to conform to the shape of said face, said pressing means comprising a pair of pressing members fixed in position on opposite sides of said path of travel of said pins above the convex seat and extending down below the upper ends of the pins for engagement with the nut washers, and means for stripping the nut washer and mastic washer assemblies from the pins as they travel down and around the forward guide element.

10. Apparatus as set forth in claim 9 wherein said pressing means comprises a pair of coaxial axially spaced presser wheels rotary on a fixed horizontal axis which is located above and which extends transverse to the path of travel of the upper reach of the conveyor, the wheels being located on opposite sides of the path of travel of the pins, the radius of the wheels being greater than the distance from their axis to the tips of the pins and somewhat less than the distance from their axis to the convex seats.

References Cited in the file of this patent

UNITED STATES PATENTS

| | | |
|---|---|---|
| 1,493,480 | De Tour | May 13, 1924 |
| 2,155,958 | Schmidt | Apr. 25, 1939 |
| 2,251,434 | Weiss et al. | Aug. 5, 1941 |
| 2,333,940 | Kuehlman | Nov. 9, 1943 |
| 2,604,692 | Broden | July 29, 1952 |
| 2,747,648 | Bingham et al. | May 29, 1956 |

FOREIGN PATENTS

| | | |
|---|---|---|
| 603,911 | Great Britain | June 24, 1948 |